US007149996B1

(12) United States Patent
Lysaght et al.

(10) Patent No.: US 7,149,996 B1
(45) Date of Patent: Dec. 12, 2006

(54) RECONFIGURABLE MULTI-STAGE CROSSBAR

(75) Inventors: Patrick Lysaght, Los Gatos, CA (US); Delon Levi, Santa Clara, CA (US); Bernard J. New, Carmel Valley, CA (US); Brandon J. Blodget, Santa Clara, CA (US)

(73) Assignee: Xilinx, Inc., San Jose, CA (US)

( * ) Notice: Subject to any disclaimer, the term of this patent is extended or adjusted under 35 U.S.C. 154(b) by 122 days.

(21) Appl. No.: 10/618,316

(22) Filed: Jul. 11, 2003

(51) Int. Cl.
*G06F 17/50* (2006.01)

(52) U.S. Cl. .............................. 716/16; 716/1; 716/14; 716/17

(58) Field of Classification Search ............... 716/1, 716/12–14, 16–17; 326/38–41; 370/389, 370/398; 710/316; 713/1, 100
See application file for complete search history.

(56) References Cited

U.S. PATENT DOCUMENTS

| 5,574,388 | A * | 11/1996 | Barbier et al. ................. 326/41 |
| 5,625,780 | A * | 4/1997 | Hsieh et al. ................. 710/316 |
| 5,825,773 | A * | 10/1998 | Shutoh et al. ............... 370/398 |
| 6,219,785 | B1 * | 4/2001 | Smith ............................. 713/1 |
| 6,265,894 | B1 * | 7/2001 | Reblewski et al. ............ 326/39 |
| 6,275,491 | B1 * | 8/2001 | Prasad et al. ................ 370/389 |
| 6,460,172 | B1 * | 10/2002 | Insenser Farre et al. ...... 716/17 |
| 6,526,558 | B1 * | 2/2003 | Agrawal et al. .............. 716/16 |
| 6,539,535 | B1 * | 3/2003 | Butts et al. .................... 716/17 |
| 6,810,514 | B1 | 10/2004 | Alfke et al. |

OTHER PUBLICATIONS

U.S. Appl. No. 10/164,508, filed Jun. 5, 2002, Young et al.
U.S. Appl. No. 10/377,857, filed Feb. 28, 2003, Blodget et al.
Monica Alderighi et al.; "A Fault-Tolerant FPGA-Based Multi-Stage Interconnection Network for Space Applications"; published Computer Society; pp. 1-5.
Ian Kyles; "Creating Large Switch Fabrics using the Three-Stage (Clos) Architecture"; Copyright VITESSE Semiconductor Corporation; pp. 1-12.
Steve Young et al.; "A High I/O Reconfigurable Crossbar Switch"; pp. 1-8.

* cited by examiner

*Primary Examiner*—Vuthe Siek
(74) *Attorney, Agent, or Firm*—W. Eric Webostad

(57) ABSTRACT

Method and apparatus for a dynamically reconfigurable, including partially reconfigurable, multi-stage crossbar switch using configurable circuitry is described. Configurable circuitry is configured to provide the multi-stage crossbar switch with at least: a first stage configured from a first portion of the configurable circuitry to provide a first plurality of crossbars; a second stage configured from a second portion of the configurable circuitry to provide a second plurality of crossbars; and a third stage configured from a third portion of the configurable circuitry to provide a third plurality of crossbars. The first stage having inputs, and the third stage having outputs. The inputs and the outputs user selectable for responsive path configurable input-to-output cross-connectivity via the first stage, the second stage and the third stage using the first interconnects and the second interconnects.

39 Claims, 11 Drawing Sheets

RECONFIGURABLE MULTI-STAGE CROSSBAR

FIELD OF THE INVENTION

One or more aspects of the present invention relate generally to an integrated circuit (IC) having configurable logic blocks and configurable interconnects, and more particularly to configuring the IC to provide a crossbar switch.

BACKGROUND OF THE INVENTION

Crossbar switches are well-known circuits for providing multiple data input to output interconnections. Crossbar switches, or more particularly digital cross-connects, are conventionally created using integrated circuits of transistors.

Programmable logic devices (PLDs) exist as a well-known type of integrated circuit (IC) that may be programmed by a user to perform specified logic functions. There are different types of programmable logic devices, such as programmable logic arrays (PLAs) and complex programmable logic devices (CPLDs). One type of programmable logic device, called a field programmable gate array (FPGA), is very popular because of a superior combination of capacity, flexibility, time-to-market, and cost.

An FPGA typically includes an array of configurable logic blocks (CLBs) surrounded by a ring of programmable input/output blocks (IOBs). The CLBs and IOBs are interconnected by a programmable interconnect structure. The CLBs, IOBs, and interconnect structure are conventionally programmed by loading a stream of configuration data (a "configuration bitstream") into internal configuration memory cells that define how the CLBs, IOBs, and interconnect structure are configured. The configuration bitstream may be read from an external memory, conventionally an external integrated circuit memory EEPROM, EPROM, PROM, and the like, though other types of memory may be used. The collective states of the individual memory cells then determine the function of the FPGA.

Large fabric crossbar switches have been implemented in FPGAS. Early implementations used static logic and routing. Later, large fabric implementations based on configurable logic and routing were created. However, these large fabric crossbar switches have not been self-contained for reconfiguration.

Notably, a large switch fabric may be achieved using smaller switch fabrics, such as by using a three-stage or Clos crossbar switch architecture. However, heretofore there has not been a PLD implementation of a reconfigurable multi-stage crossbar switch architecture.

Accordingly, it would be both desirable and useful to provide a reconfigurable crossbar switch implemented with configurable logic to overcome the above shortcomings.

SUMMARY OF THE INVENTION

An aspect of the invention is a programmable logic device, comprising: configurable logic blocks configured to provide a multi-stage crossbar switch, where the multi-stage crossbar switch includes: a first stage configured from a first portion of the configurable logic blocks to provide a first plurality of crossbars; a second stage configured from a second portion of the configurable logic blocks to provide a second plurality of crossbars; a third stage configured from a third portion of the configurable logic blocks to provide a third plurality of crossbars; first interconnects for coupling the first plurality of crossbars to the second plurality of crossbars; and second interconnects for coupling the second plurality of crossbars to the third plurality of crossbars. The first stage providing inputs, and the third stage providing outputs. The paths between crossbar switch inputs and outputs being user configurable by selection of which of the inputs and outputs to use to provide input-to-output cross-connectivity via the first stage, the second stage and the third stage using the first interconnects and the second interconnects.

Another aspect of the invention is a method for providing a crossbar switch, comprising: providing a first portion of configurable logic configurable to provide a first stage of crossbars; providing a second portion of configurable logic configurable to provide a second stage of crossbars; providing a third portion of configurable logic configurable to provide a third stage of crossbars; and partially reconfiguring a crossbar of at least one of the first, the second and the third stage of crossbars to provide an input-to-output cross-connection from input of the first portion of the configurable logic to output of the third portion of the configurable logic via the first, second and third portion of configurable logic.

Another aspect of the invention is a crossbar switch for a programmable logic device. The crossbar switch comprises input pins and output pins, each input pin being connectable to each output pin for cross-connectivity through an odd number of crossbar stages equal to or greater than three. The crossbar stages are provided by configurable circuitry configured to provide crossbars. The cross-connectivity is reconfigurable responsive to user programming to indicate which input pins are to be cross-connected to which output pins for the crossbars instantiated in the programmable logic device.

Another aspect of the invention is a crossbar switch kit. The crossbar switch kit comprises a programmable logic device including configurable circuitry and configuration information for configuring the programmable logic device as a crossbar switch having input pins and output pins, where each input pin is connectable to each output pin for cross-connectivity through an odd number of crossbar stages greater than one. The crossbar stages are provided by configuring the configurable circuitry to provide crossbars.

Another aspect of the invention is a method for instantiating a crossbar switch in a programmable logic device. The crossbar instantiation comprises: providing predefined configuration bits for the instantiating of the crossbar infrastructure in the programmable logic device, where the crossbar infrastructure includes at least three crossbar stages; and providing user access to select one or more inputs and outputs of the crossbar infrastructure for responsively configuring path cross connectivity.

Yet another embodiment of the present invention includes an integrated circuit comprising: 1) configurable logic blocks, where the configurable logic blocks are configured to provide a multi-stage crossbar switch; 2) the multi-stage crossbar switch including: a first stage configured from a first portion of the configurable logic blocks to provide a first plurality of crossbars, where the first stage has inputs; a second stage configured from a second portion of the configurable logic blocks to provide a second plurality of crossbars; a third stage configured from a third portion of the configurable logic blocks to provide a third plurality of crossbars, where the third stage has outputs; first interconnects for coupling the first plurality of crossbars to the second plurality of crossbars; and second interconnects for coupling the second plurality of crossbars to the third plurality of crossbars; and 3) an embedded processor operably configured to reconfigure at least one of the first, second, or third stages.

An embodiment of the present invention includes an integrated circuit comprising a crossbar switch having configurable logic blocks; and an embedded processor operably configured to reconfigure the crossbar switch. In addition, the cross bar switch may be a multi-stage crossbar switch having configurable interconnects coupling inputs of the multi-stage crossbar switch to outputs of the multi-stage crossbar switch.

BRIEF DESCRIPTION OF THE DRAWINGS

Accompanying drawing(s) show exemplary embodiment(s) in accordance with one or more aspects of the present invention; however, the accompanying drawing(s) should not be taken to limit the present invention to the embodiment(s) shown, but are for explanation and understanding only.

DETAILED DESCRIPTION OF THE DRAWINGS

Recently, a crossbar switch was implemented in an FPGA as described by co-pending U.S. patent application Ser. No. 10/164,508, entitled "LARGE CROSSBAR SWITCH IMPLEMENTED IN FPGA," filed Jun. 5, 2002, by Steven P. Young, et. al., which is herein incorporated by reference in its entirety. In that description, lookup table ("LUT") and input multiplexer (IMUX) structures were chained together to form wide multiplexers ("large switch fabric"). To form a 928 input by 928 output ("928×928") crossbar switch, such wide multiplexers were replicated 928 times. This consumed 26,912 LUTs of the FPGA. With an architecture where each CLB has eight LUTs, 3,364 CLBs were used to implement basic multiplexing logic for a 928×928 crossbar switch. In this architecture, latency is path dependent. For example, in the 928×928 crossbar switch, one path could have one-clock cycle delay, while another path could have a twenty-clock cycle delay. Thus, in Young et al., latency varies depending on the input and output selected. To create the same clock latency for all paths, programmable delays were added to the output of each wide multiplexer. Thus, these programmable delays were added to compensate for differences in latency for respective paths. The Young et. al. crossbar switch is a large switch fabric, that has certain advantages over the prior art. However, as described below embodiments of the present invention, using connections of small switch fabrics have improvements over the Young et. al. crossbar switch.

Also the Young et. al. single stage crossbar switch, is not self-reconfigurable. Embodiments of the present invention have an embedded processor (or customized digital logic) on-chip which allows for self-contained reconfiguration. This self-reconfiguration is applicable to both single stage, as well as multi-stage crossbar switches.

Figure 1:
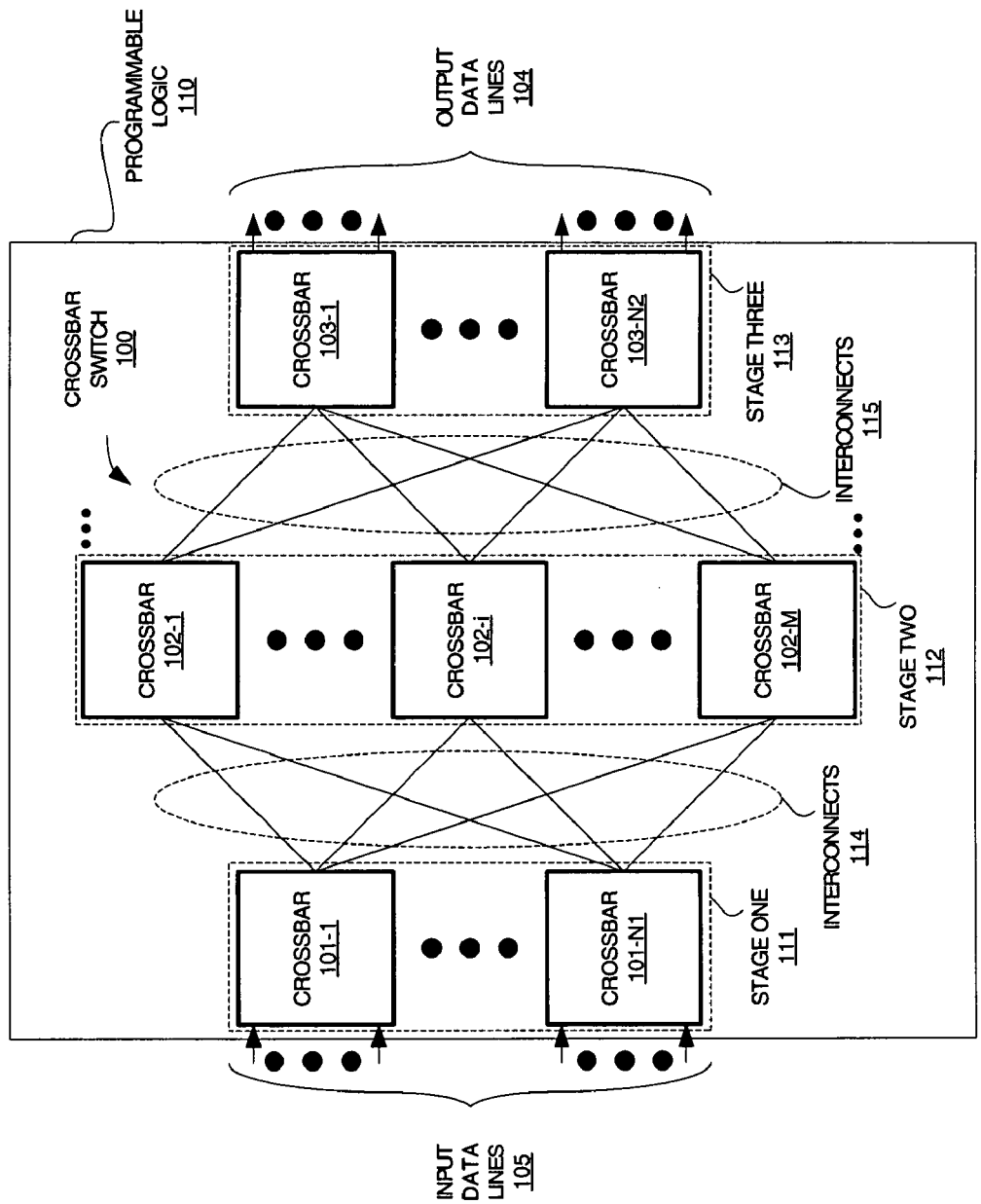
FIG. 1 is a block diagram depicting an exemplary embodiment of a three-stage crossbar switch implemented in programmable logic.

FIG. 1 is a block diagram depicting an exemplary embodiment of a three-stage crossbar switch 100 implemented in programmable logic 110. Configurable logic blocks of programmable logic 110 are configured to provide three-stage crossbar switch 100. Crossbar switch 100 includes stage one 111 crossbars 101-1 to 101-N1 (collectively "crossbars 101") of configurable logic, stage two 112 crossbars 102-1 to 102-M (collectively "crossbars 102") of configurable logic and stage three 113 crossbars 103-1 to 103-N2 (collectively "crossbars 103") of configurable logic, for N1, N2, and M integers. Integer values for M, N1, and N2 will depend upon size of crossbar switch 100. Values for M, N1, and N2 may be determined for a desired crossbar switch size in a known manner. In a preferred embodiment N1=N2=N, but in other embodiments N1 and N2 may be different integer numbers. For purposes of clarity, a 928×928 input-by-output crossbar switch with N1=N2=N=29 and M=64 is described, though other sizes may be used. For this example, crossbars 101, 102 and 103 inputs-by-outputs are respectively 32×64, 29×29 and 64×32. Notably, for a non-blocking crossbar switch, a minimum number of M equal to 63 may be used, though M equal to 64 is used herein for convenience.

Notably, though a three stage crossbar switch is shown, there may be multiple interim stages, such as stage two 112, to form an odd number of stages for crossbar switch 100, and thus crossbar switch 100 has an odd number of stages and at least three stages. Furthermore, more than one interim stage, such as more than one stage two 112, may be used in succession. With respect to a multi-stage crossbar switch having one or more interim stages, an input stage, such as stage one 111, and an output stage, such as stage three 113, the multi-stage crossbar switch is not deterministic of which connections of the one or more interim stages, such as stage two 112, are used. Thus, a search is done for any unused interim stage connection for coupling an output of the input stage to an input of the output stage. For partial reconfiguration, described below in additional detail, if a connection of an interim stage has previously been used, then to reuse such a connection it is first disconnected from its previous state and then reconnected for its next state. However, to make initial input-to-output connectivity, one crossbar in each stage of a crossbar switch needs to be configured in order to make a connection from an input, such as a line of input data lines 105, to an output, such as a line of output data lines 104.

A plurality of input data lines 105 and output data lines 104, namely, 928 each for the example, are used for cross connecting selected inputs to selected outputs. Input data lines 105 are connected to crossbars 101 for receiving input data, and output data lines are connected to crossbars 103 for outputting the input data.

Each of crossbars 101 is connected to all of crossbars 102, and each of crossbars 102 is connected to all of crossbars 103. Interconnects 114 connect crossbars 101 to 102, and interconnects 115 connect crossbars 102 to 103. Though interconnects 114 and 115 appear to be emanating from a single location from stage one 111 and stage two 112 crossbars, respectively, interconnects 114 and 115 actually emanate from a plurality of respective intra-crossbar switch outputs, as described below in additional detail. Crossbar switch 100 is a non-blocking architecture, namely, any input may reach any one output without preventing any other input from reaching any other one output. In some embodiments, one input may reach more than one output for data broadcasting or multicasting.

Figure 1A:
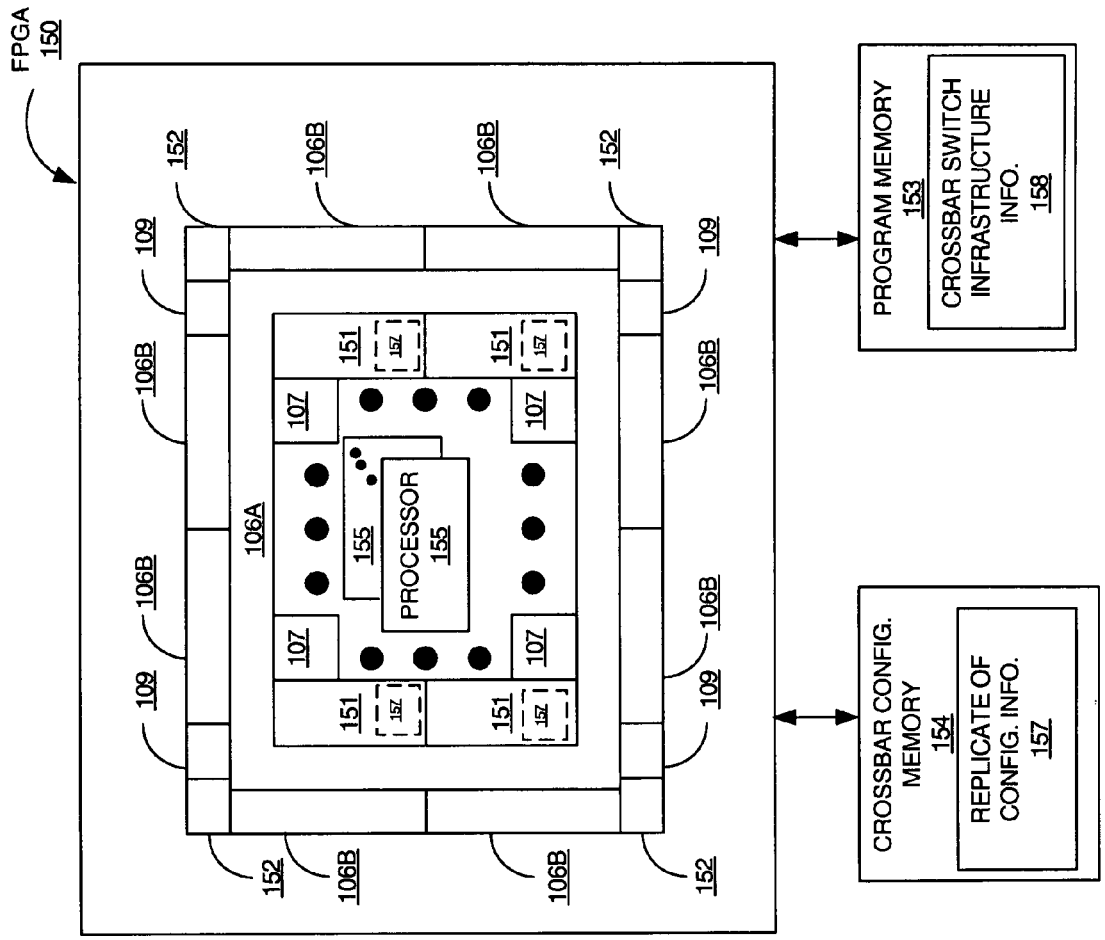
FIG. 1A is a high-level block diagram depicting an exemplary embodiment of an FPGA.

FIG. 1A is a high-level block diagram depicting an exemplary embodiment of an FPGA 150. FPGA 150 is an example of an integrated circuit that may be used for implementing one or more aspects of the invention. However, other programmable logic device ("PLD") integrated circuits other than FPGAS, including complex PLDS ("CPLD") and other integrated circuits with configurable logic or functions, may be used.

FPGA 150 includes configurable logic blocks ("CLBs") 107, I/O routing ring 106A, memory, such as random access memory 151, delay lock loops (DLLS) 109, multiply/divide/de-skew clock circuits 152, and programmable input/output blocks ("IOBs") 106B. FPGA 150 may optionally include one or more embedded hardware or software instantiated processors 155 (an example of an FPGA with an embedded hardware processor, i.e., hard-core processor, is the IBM® PowerPC given in Virtex-II Pro™ Platform FPGA Handbook, October 2002, by Xilinx Corp. of San Jose Calif.; an example of a software processor instantiated in a programmable logic fabric, i.e., soft-core processor is the MicroBlaze™ processor core of Xilinx Inc. of San Jose, Calif.). In other embodiments, embedded processor 155 may be a digital signal processor, an application specific processor, or even customized logic to perform partial reconfiguration. IOBs 106B may include transceivers, such as multi-gigabit transceivers ("MGTs"). DLLs 109 and clock circuits 152 collectively provide digital clock modules or managers ("DCMs").

CLBs 107 conventionally include one or more selectors under configuration bit control, and one or more programmable function generators. For clarity by way of description of an embodiment, CLB input selectors are described below as input multiplexers ("IMUXs"), and programmable function generators are described below as look-up tables ("LUTs"). However, it should be appreciated other well-known forms of selectors under configuration bit control or function generators may be used.

External memory 153 may be coupled to FPGA 150 to store and provide a configuration bitstream to configure FPGA 150, namely, to program one or more memory cells to configure resources of FPGA 150, including CLBs 107 and IOBs 106B. For example, external memory 153 may be used to store crossbar switch infrastructure configuration information 158, such as a Clos architecture crossbar switch 100. Additionally, external memory 154 may be coupled to FPGA 150 to store connection status information 157, which is a replica of configuration memory. For example, because crossbar switch 100 instantiated in FPGA 150 is user configurable, including reconfigurable, any user programmably selectable input 105 may be connected to any user programmably selectable output 104. Thus, by selecting which inputs 105 and which outputs 104 to use, connections within crossbar switch 100 are used to provide input-to-output connectivity, as described below in additional detail. Accordingly, information associated with such input-to-output connectivity is stored in configuration memory cells, as such memory is programmed to provide such input-to-output connectivity, and optionally may be stored in external memory 154. Notably, if external memory 154 is omitted, or in addition to external memory 154, internal memory 151, such as block random access memory (BRAM), may be used to store connection status information 157, which may be modified on-chip with use of embedded processor 155, i.e., one or more soft-core or hard-core processors or a combination thereof.

Figure 2:
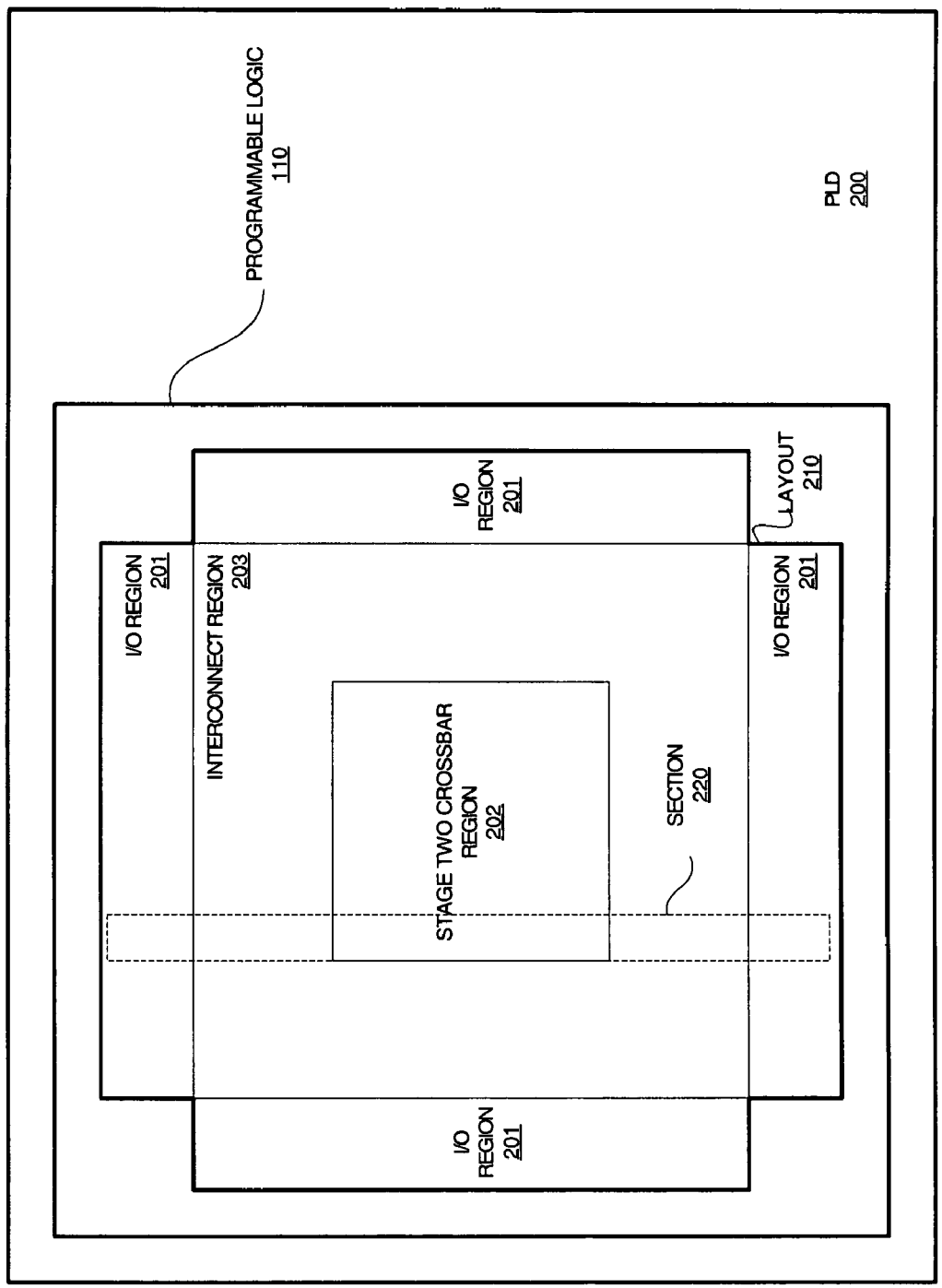
FIG. 2 is a block diagram depicting an exemplary embodiment of a layout for the three-stage crossbar switch of FIG. 1 in programmable logic of a programmable logic device ("PLD").

FIG. 2 is a block diagram depicting an exemplary embodiment of a layout 210 for crossbar switch 100 of FIG. 1 in programmable logic 110 of a PLD 200, such as FPGA 150 of FIG. 1A. Stage one and stage three crossbars 101 and 103 are interleaved in input/output ("I/O") regions 201. Alternatively, stage one crossbars 101 may be disposed outside of and in near proximity to right and left sides of interconnect region 203, and stage three crossbars may be disposed outside of and in near proximity to top and bottom sides of interconnect region. Crossbars 101 and 103 are disposed outside and in near proximity to a perimeter or interconnect region 203 to facilitate inter-crossbar connection routing for interconnects 114 and 115 of FIG. 1. Thus, inter-crossbar connections radiate from at least an approximately centrally disposed region in four directions. Within such a perimeter is stage two crossbar region 202 for crossbars 102 of FIG. 1. Notably, crossbars 102 may be in an array, for example crossbars 102 may be in an array corresponding to CLBs 107 of FIG. 1A. Notably, interconnect region 203 may be reduced or completely avoided where crossbars 101 and 103 are substantially close to or border crossbars 102.

Figure 2A:
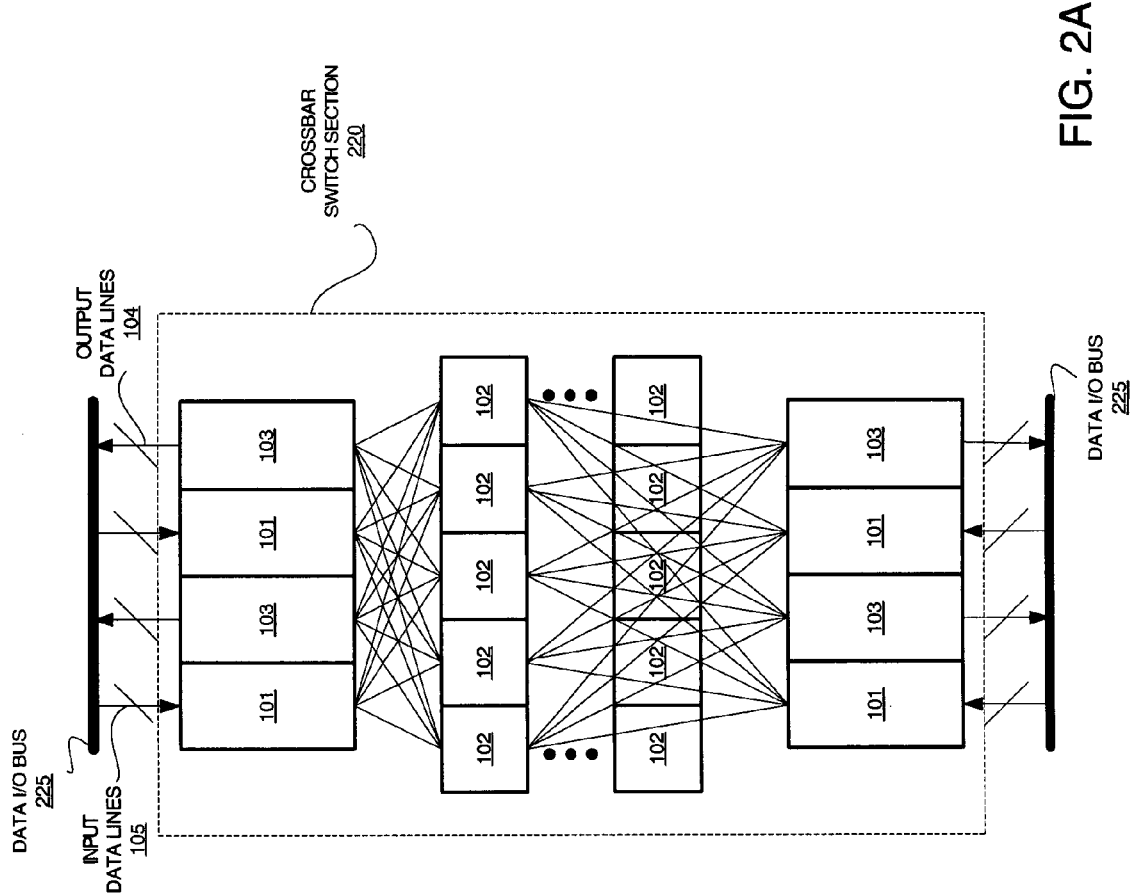
FIG. 2A is a lower-level block diagram depicting a crossbar switch section of the three-stage crossbar switch of FIG. 2.

FIG. 2A is a lower-level block diagram depicting a crossbar switch section 220 of the three-stage crossbar switch of FIG. 2. Input and output data lines 105 and 104 may be coupled to a data I/O bus 225. Crossbars 101 and 103 are interleaved and connected to crossbars 102, as previously described. It should be understood that interconnects for interconnecting crossbars 101 and 103 to crossbars 102 extend outside of crossbar switch section 220 to other crossbars 101, 102 and 103, as described with respect to FIG. 1.

Figure 3:
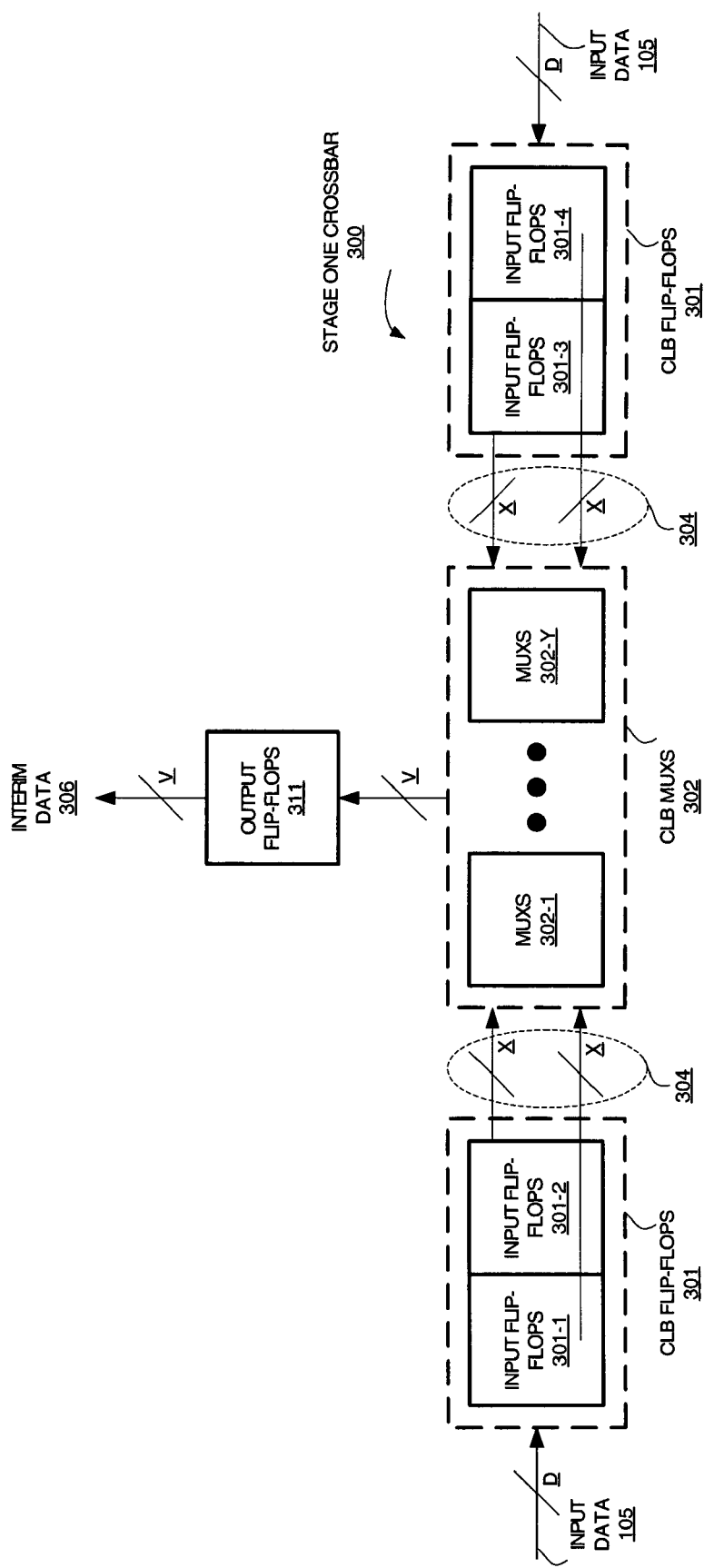
FIGS. 3, 4 and 5 are block diagrams respectively depicting stage one, two and three crossbars for the three-stage crossbar switch of FIG. 2.
Figure 4:
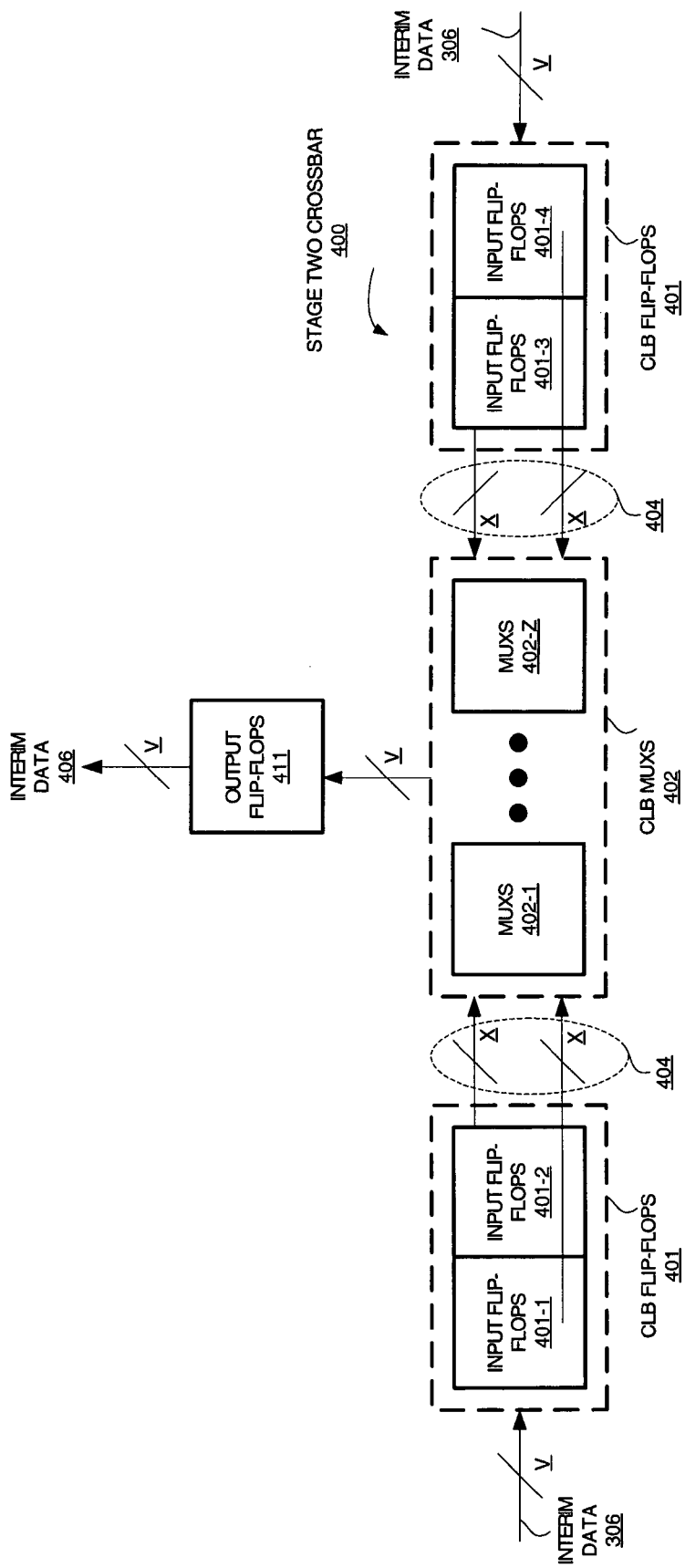
Figure 5:
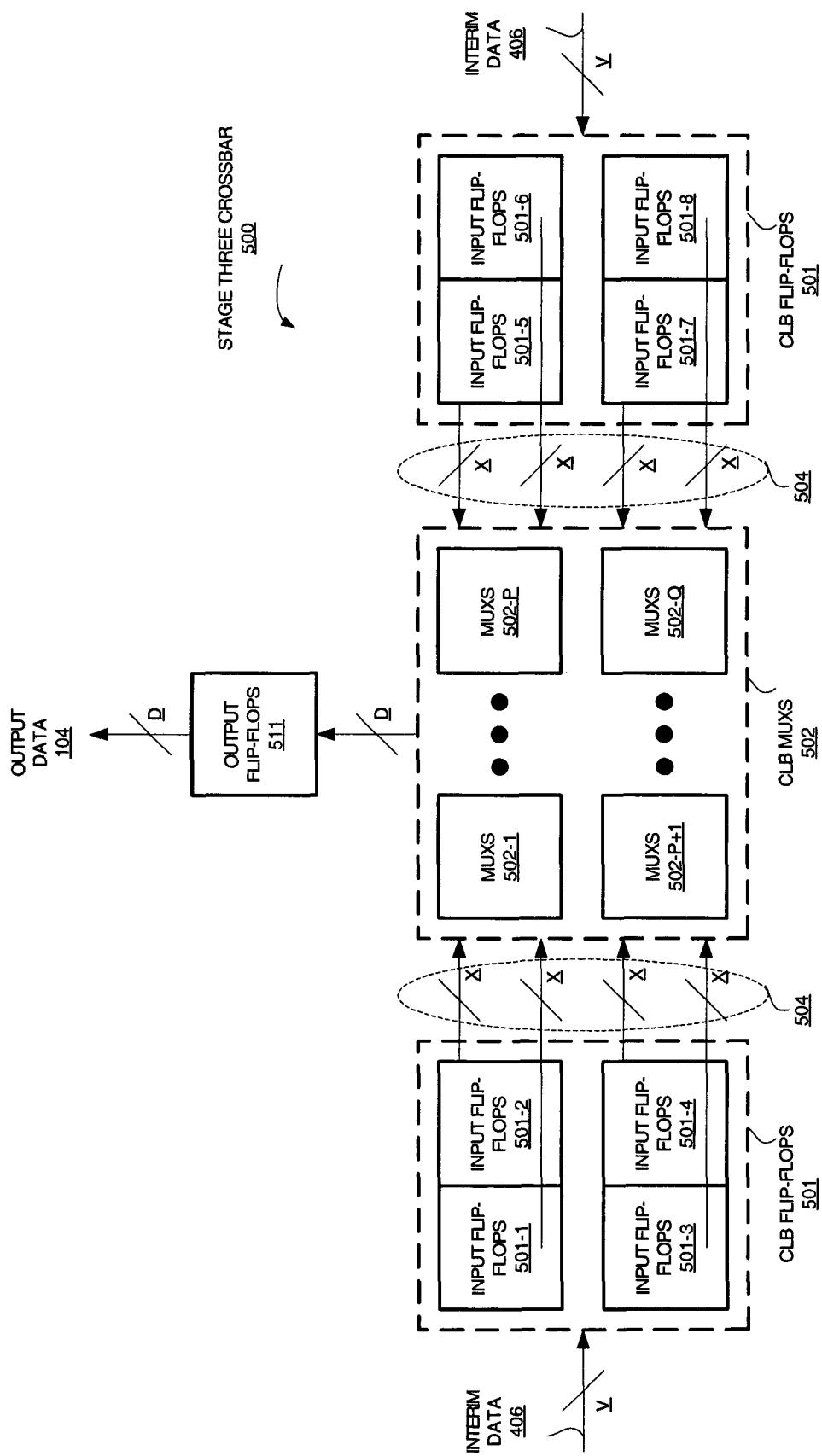

FIGS. 3, 4 and 5 are block diagrams respectively depicting stage one, two and three crossbars for the three-stage crossbar switch of FIG. 2. Each crossbar includes one or more CLBs configured as input registers 301, 401 and 501 and one or more other CLBs configured as multiplexers 302, 402 and 502, as well as one or more output registers 311, 411 and 511. Such input and output registers may be implemented as respective flip-flops or LUTs configured as one-bit shift registers. Furthermore, output flip-flops 311, 411 and 511 may be implemented within the same CLBs used for implementing multiplexers 302, 402 and 502, respectively.

Figure 6:
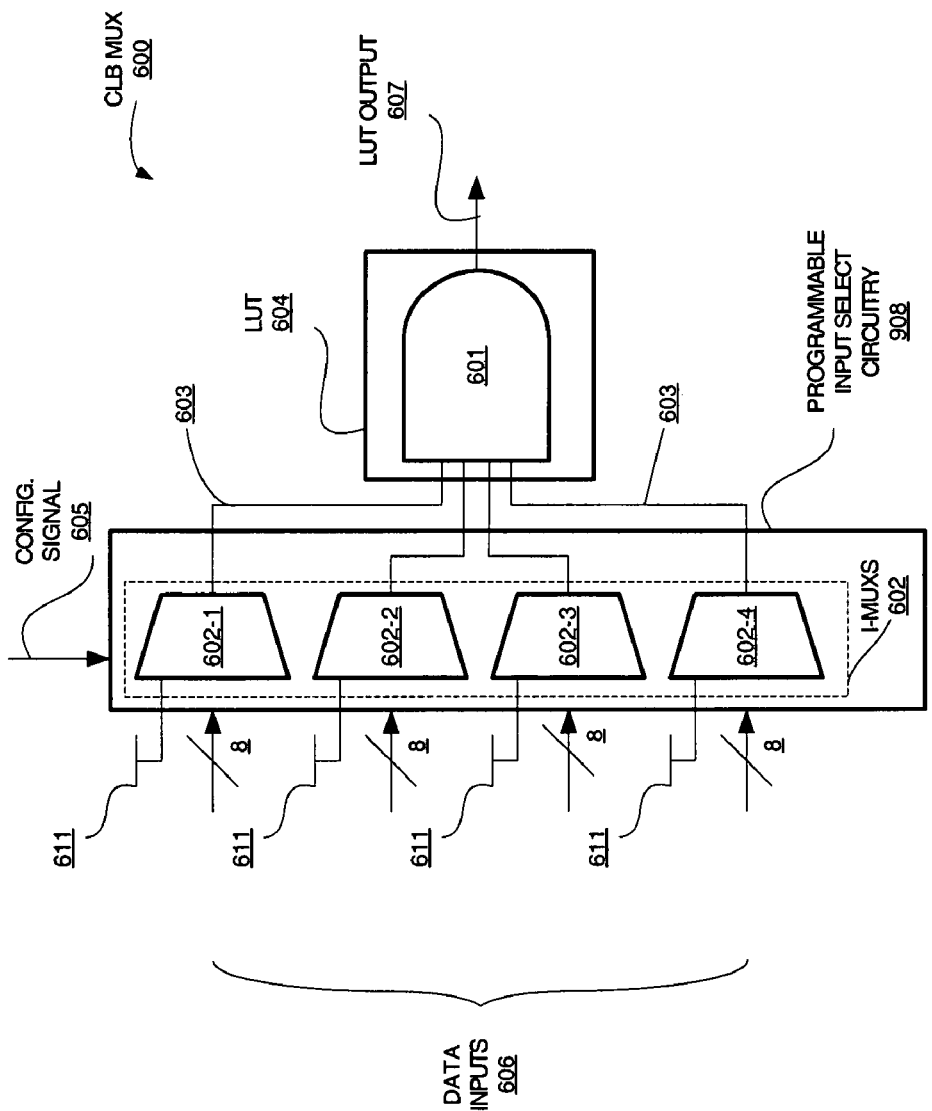
FIG. 6 is a logic-level schematic diagram depicting a multiplexer as programmatically configured in a configurable logic block of the PLD of FIG. 2.

FIG. 6 is a logic-level schematic diagram depicting a multiplexer as programmably configured in a CLB, namely, a CLB MUX 600. CLB MUX 600 may be a MUX of MUX CLBs 302, 402 or 502 of PLD 200 of FIGS. 2–5. Data inputs 606 are provided to IMUXs 602. For purposes of clarity, four sets of 8 bit width inputs are respectively provided to four IMUXs 602-1, 602-2, 602-3 and 602-4, the outputs 603 of IMUXs 602 are provided to a LUT 604 to provide LUT output 607. LUT 604 is configured to provide an AND gate 601. Each IMUX 602 is internally connected to provide a logic one output to LUT 604 as illustratively shown as a ninth input tied to a high voltage level 611. However, when programmed to be used to provide cross connectivity, an IMUX of IMUXs 602 of a CLB MUX provides a signal path. IMUX 602 is programmed to provide a logic one when in an unused state. Thus, one IMUX provides an output signal to LUT 604 and the remainder of the IMUXs 602 provide a logic one to LUT 604. For purposes of clarity, a CLB MUX is described as a 32 to 1 multiplexer, though one may think of such a multiplexer as a 36 to 1 multiplexer due to the internally connected inputs. Furthermore, programmable function generators, such as LUTs, may be configured to have input sizes other than 4 bits wide, as is known.

Figure 8:
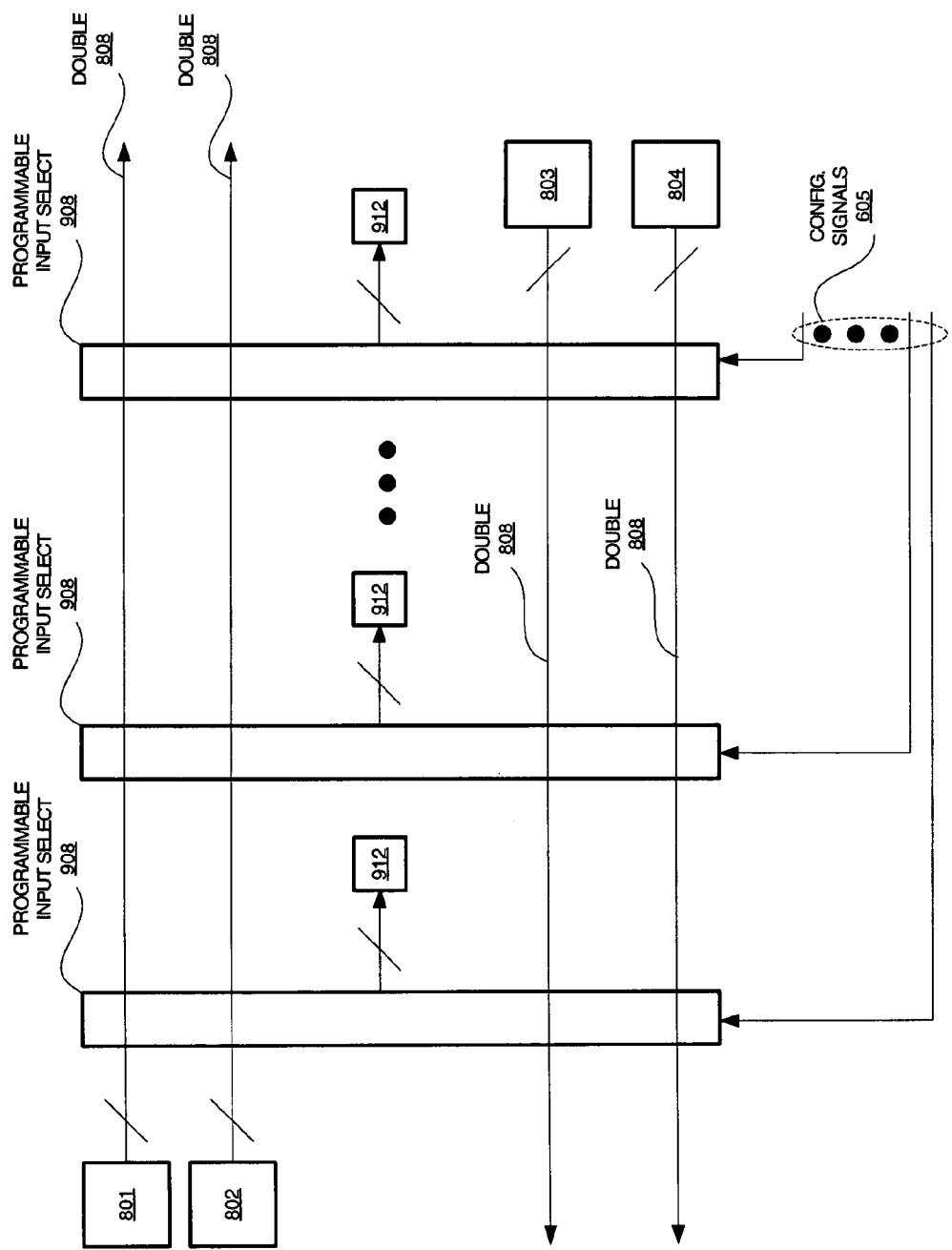
FIG. 8 is a block diagram depicting programmable input selects for the PLD of FIG. 2.

With continuing reference to FIG. 6 and renewed reference to FIGS. 3, 4 and 5, a configuration control signal 605 is provided to programmable input select circuitry 908 of FIG. 8, to selectively couple and uncouple outputs of input flip-flops 301, 401 and 501 to and from inputs of IMUXs 602 of MUX CLBs 302, 402 and 502, respectively, through partial reconfiguration.

With reference to FIG. 3, input data 105 of bit width D is provided to input flip-flops 301 of stage one crossbar 300. Four CLBS, 301-1, 301-2 and 301-3, 301-4, two on each side of MUX CLBs 302, may be used to implement input flip-flops 301. Outputs 304 of input flip-flops 301 of bit width X are respectively provided to each of MUX CLBs 302. For four sets of input flip-flops, there are four respective sets of outputs 304 of bit width X. There are Y MUX CLBS 302, which MUX CLBS 302 are chained to double wires ("doubles") to receive outputs 304. Double wires or double-length lines are conventionally integrated circuit wires having a length of approximately two CLBs. Each of MUX CLBs 302 may be selectively coupled and uncoupled to none or some portion, such as one, of outputs 304. Outputs 304 processed through MUX CLBs 302 collectively provide an interim data output 306 via output flip-flops 311 of bit width V. Notably, D, P, Q, V, X, Y and Z as used herein are all are positive integers.

Continuing the above example, stage one crossbar 300 is 32×64 crossbar. Thus, input data width D is 32 bits wide, which in this exemplary embodiment is broken out into four 8 bit sets. Each bit of each set is provided to an input flip-flop, and thus each of four CLBs forming input flip-flops has eight flip-flops, namely, one for each input bit. Each set of eight input flip-flops provides 8 bit of output for outputs 304. Since there are four sets, a bit width of 32 is provided to MUX CLBs 302. In this exemplary embodiment there are eight MUX CLBs 302, and each MUX CLB 302 has eight CLB MUXs 600. Thus, there are 64 CLB MUXs each having input width 32. Each set of outputs 304 is coupled through programmable circuitry 908 (shown in FIG. 8) to each CLB MUX 600 of each MUX CLB 302. For this exemplary embodiment, Y is equal to eight as there are eight MUX CLBs 302; however, other numbers of MUX CLBs 302 may be used. The output from MUX CLBs 302 is provided to V output flip-flops 311. For this exemplary embodiment, V is equal to eight as there are eight outputs from the eight MUX CLBs 302; however, other numbers of outputs may be used.

It should be appreciated that data is pipelined through stage one crossbar 300. In other words, each bit of data goes through a single flip-flop of input flip-flops 301, then through a single CLB MUX 600 of MUX CLBs 302, and then through a single output flip-flop of output flip-flops 311 before being output as part of interim data 306. Accordingly, uniform pipelining provides the same latency for all data bits of interim data 306. Thus, data is pipelined from a register stage to a multiplexing stage to a register for three stage intra-crossbar processing.

With reference to FIGS. 4 and 6, interim data 306 of bit width V is provided to input flip-flops 401 of stage two crossbar 400. Four CLBs, 401-1, 401-2 and 401-3, 401-4, two on each side of MUX CLBs 402, may be used to implement input flip-flops 401. Outputs 404 of input flip-flops 401 of bit width X are respectively provided to each of MUX CLBs 402. For four sets of input flip-flops, there are four respective sets of outputs 404 of bit width X. There are Z MUX CLBs 402, which MUX CLBs 402 are chained to double wires to receive outputs 404. Each of MUX CLBs 402 may be selectively coupled and uncoupled to none or some portion, such as one, of outputs 404. Outputs 404 processed through MUX CLBs 402 collectively provide an interim data output 406 of bit width V. Notably, Z is a positive integer.

Continuing the above example, stage two crossbar 400 is 29×29 crossbar. It should be understood that, while the example shows a square 29×29 crossbar, other embodiments include a K×K square crossbar, where K is a positive integer. In still other embodiments, a non-square K1×K2 crossbar may be used, where K1 and K2 are positive integers. Interim data 306, provided to stage two crossbar 400, is 29 bits wide. Accordingly, while there are 29 stage one crossbars 300, there are 64 square (29×29) stage two crossbars 400. Each bit of interim data 306 is provided to an input flip-flop, and thus each of four CLBs forming input flip-flops has eight flip-flops, namely, one for each input bit. Each set of eight input flip-flops provides 8 bits of output for outputs 404. Since there are four sets, a bit width of 32 is provided to MUX CLBs 402. However, in this exemplary embodiment, as a 29×29 crossbar is described, the input is truncated. Thus, for example, of 8 bit lines for one set of inputs 404, only 5 bit lines are used. Accordingly, each CLB MUX 600 in this exemplary embodiment is effectively a 29×1 MUX. In this exemplary embodiment there are four MUX CLBs 402, and each MUX CLB 402 has eight CLB MUXs 600. Thus, in this exemplary embodiment, there are 32 MUXs each having input width 32 of which 29 MUXs and 29 inputs to each such MUX are used. Each set of outputs 404 is coupled through programmable circuitry 908 (shown in FIG. 8) to each CLB MUX 600 of each MUX CLB 402. In this exemplary embodiment, Z is equal to 4, though other numbers of MUX CLBs 402 may be used.

It should be appreciated that data is pipelined through stage two crossbar 400. In other words, each bit of data goes through a single flip-flop of input flip-flops 401, then through a single CLB MUX 600 of MUX CLBs 402 and then through a single output flip-flop 411 before being output as part of interim data 406. Accordingly, uniform pipelining provides the same latency for all data bits of interim data 406. Thus, data is pipelined from a register stage to a multiplexing stage to another register stage for three stage intra-crossbar processing.

With reference to FIGS. 5 and 6, interim data 406 of bit width V is provided to input flip-flops 501 of stage three crossbar 500. For example, eight CLBS, 501-1, 501-2, 501-3, 501-4 and 501-5, 501-6, 501-7, 501-8, four on each side of MUX CLBs 502, may be used to implement input flip-flops 501. Outputs 504 of input flip-flops 501 of bit width X are respectively provided to each of MUX CLBs 502. For example, for eight sets of input flip-flops, there are eight respective sets of outputs 504 of bit width X. There are twice P, or Q, MUX CLBs 502, which MUX CLBs 502 are chained to double wires to receive outputs 504 and are coupled together in pairs to provide P pairs of MUX CLBs 502. Each of MUX CLBs 502 may be selectively coupled and uncoupled to none or some portion, such as one, of outputs 504. Outputs 504 processed through MUX CLBS 502 collectively provide data output 104 of bit width D.

Continuing the above example, stage three crossbar 500 is 64×32 crossbar, where P and Q are respectively equal to 8 and 16 though other numbers for P and Q may be used.

Interim data 406, provided to stage three crossbar 500, is 64 bits wide. Accordingly, while there are 64 stage two crossbars 400, there are 29 64×32 stage three crossbars 500. Each bit of each set of interim data 406 is provided to an input flip-flop 501, and thus each of eight CLBs forming input flip-flops 501 has eight flip-flops, namely, one for each input bit. Each set of eight input flip-flops provides 8 bits of output for outputs 504. Since there are eight sets of 8 bit wide inputs, a bit width of 64 is provided to pairs of CLB MUXs 600 of MUX CLBs 502. In this exemplary embodiment, there are eight upper and eight lower CLB MUXS 600 for each MUX CLB 502, and so there are eight MUX CLB 502 pairs. So, a first group of CLB MUXs 600 of eight MUX CLBs 502 respectively receive 32 bit data input directly from input flip-flops 501, and a second group of CLB MUXs 600 of the other eight MUX CLBs 502 respectively receive 32 bit input directly from input flip-flops 501 and one data bit from output of CLB MUXs 600 of the first group of MUX CLBs 502. Each set of outputs 504 is coupled through programmable circuitry 908 (shown in FIG. 8) to each CLB MUX 600 of each MUX CLB 502.

Figure 7:
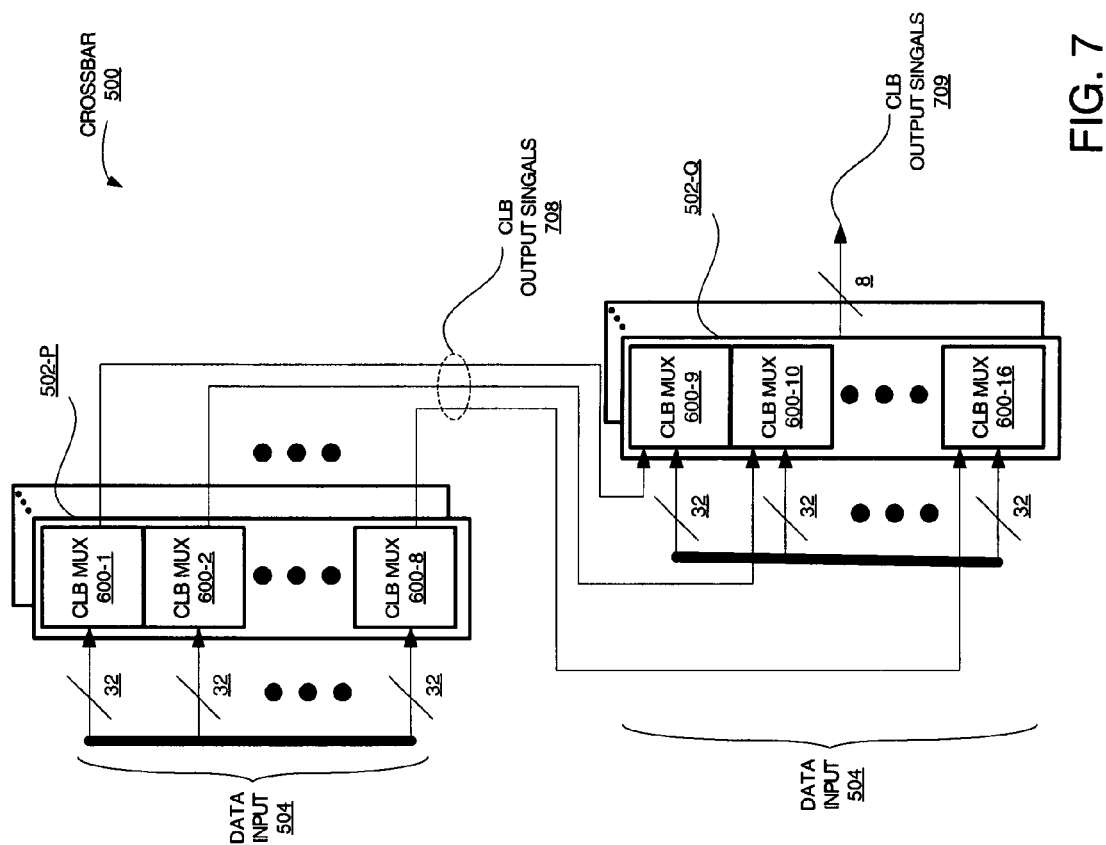
FIG. 7 is a block diagram depicting a configurable logic block implementation for a stage three crossbar of FIG. 5.

FIG. 7 is a block diagram depicting a configurable logic block implementation for a portion of a stage three crossbar 500 of FIG. 5. Data input 504 is provided to CLB MUXs 600-1 through 600-8 of MUX CLB 502-P. Notably, for this exemplary embodiment, a bit width of 32 bits is respectively provided to each CLB MUX 600-1 through 600-8. Furthermore, it should be understood that MUX CLB 502-P represents a first group of MUX CLBs 502, namely, MUX CLBs 502-1 through 502-8, where each MUX CLB in the first group includes eight CLB MUXS 600. For example, data input 504 is provided to CLB MUXs 600-9 through 600-16 of MUX CLBS 502-Q, and a one bit output from each of CLB MUXs 600-1 through 600-8, namely, respective CLB MUX signals 708, is respectively provided to CLB MUXs 600-9 through 600-16 of CLB MUXs 502-Q. Notably, for this exemplary embodiment, a bit width of 32 bits is respectively provided to each CLB MUX 600-9 through 600-16. Furthermore, it should be understood that MUX CLB 502-Q represents a second group of MUX CLBs 502, namely, MUX CLBs 502-9 through 502-16, where each MUX CLB in the second group includes eight CLB MUXs 600. It should be understood that the first group of CLB MUXs 600-1 to 600-8 each respectively have 32-bit inputs, and the second group of CLB MUXs 600-9 to 600-16 each respectively have 33-bit inputs. An 8-bit wide output (one bit per pair of CLB MUXs), namely, MUX CLB output signals 709, forms a portion of data output 104. Accordingly, as CLB MUXs are associated in pairs, depending on origin of input data, data will pass through one or two CLB MUX stages in this exemplary embodiment. Notably, depending on bit width, more than two CLB MUX stages may be used.

It should be appreciated that data is pipelined through stage three crossbar 500. In other words, each bit of data goes through a single flip-flop of input flip-flops 501, then through either one or two CLB MUXs 600 of MUX CLBs 502 and then through a single output flip-flop 511 before being output as part of output data 104. Accordingly, uniform pipelining provides the same latency for all data bits of output data 104. Thus, data is pipelined from a register stage to a multiplexing stage to another register stage for three stage intra-crossbar processing.

Notably, in the exemplary embodiment there are three cross-bar stages, where in each stage data goes through one and only one input flip-flop and one and only one output flip-flop. Accordingly, no matter what path is taken, there is a six clock cycle latency, namely, two flip-flops times three crossbar stages. Having a same latency for each path avoids having to provide latency compensation on outputs.

FIG. 8 is a block diagram depicting programmable input selects for PLD 200 of FIG. 2. Input stage registers, such as flip-flops 301, 401 and 501, have outputs that are respectively provided to programmable input selects 908 for a respective crossbar, such as crossbars 300, 400 and 500. Programmable input selects 908, which are selectors under configuration bit control, are programmed to select one output from a group of flip-flops. So for example suppose there are four groups of flip-flops 801, 802, 803 and 804, each with the same respective output width, programmable input selects 908, such as IMUXs 602 of FIG. 6, are configurable via configuration signals 605 to select a set of inputs from output of such flip-flops. Double length lines 808 are used to couple outputs of input flip-flops to programmable input selects 908 for selectively coupling and uncoupling IMUXs of CLB MUXs to and from flip-flop outputs. To generate configuration signals 605, a configuration, reconfiguration or partial configuration bitstream may be used. Each output from selects 908 is provided to a respective programmable function generator 912, such as a LUT 604 of FIG. 6.

Figure 9:
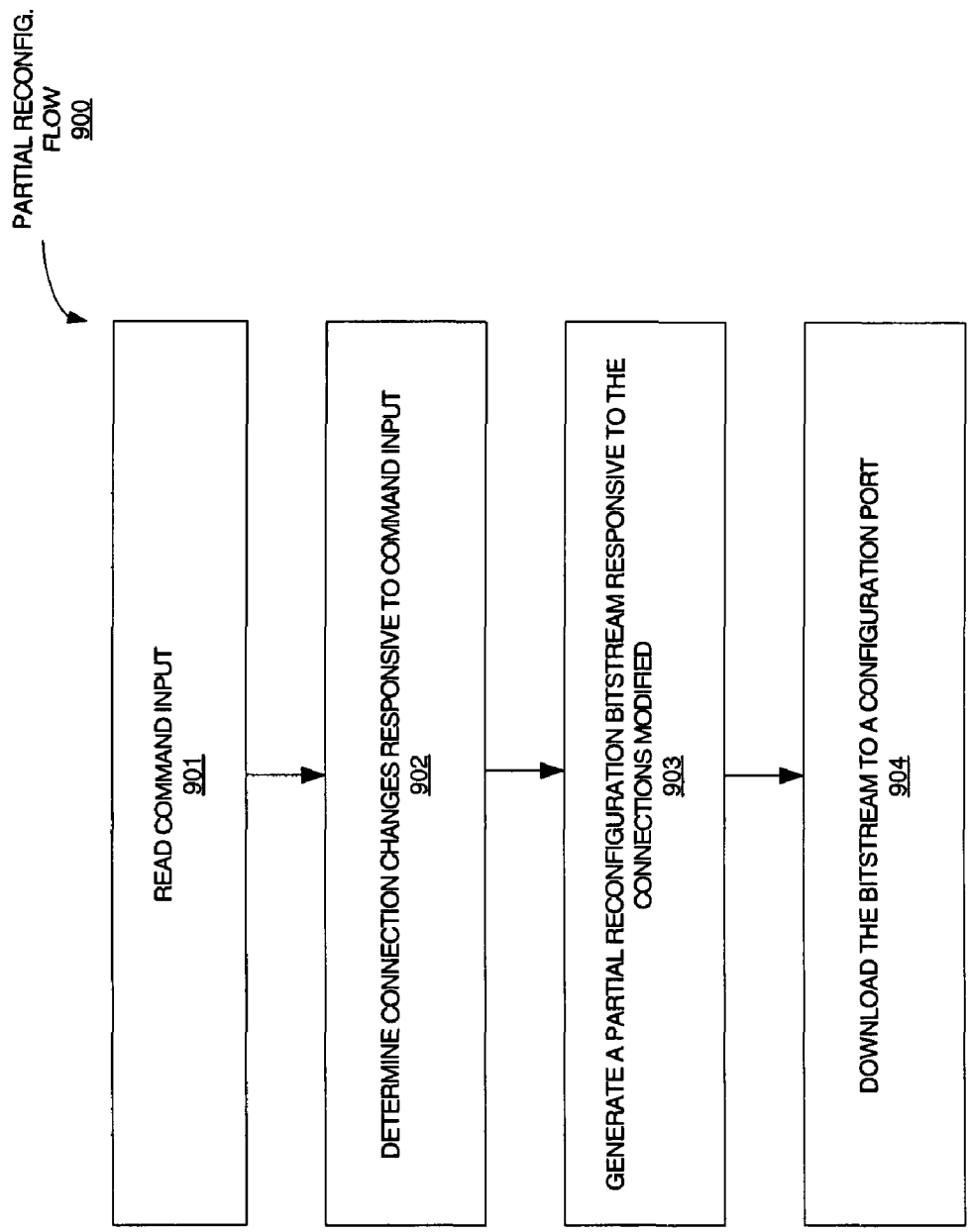
FIG. 9 is a block diagram depicting a respective partial reconfiguration flow.

FIG. 9 is a block diagram depicting a respective partial reconfiguration flow 900. At 901, command input is read. This command input may be provided by a user to indicate a data input pin of a first stage of crossbars and an associated data output pin, or output pins for multicasting or broadcasting, of a last stage of crossbars to be used to provide input-to-output cross-connectivity.

At 902, connection changes are determined responsive to command input from 901. Accordingly, switch settings are determined, which determination may include identifying unused resources for providing the input-to-output cross connectivity using the designated input and output pins.

At 903, determined connection changes from 902 are embedded in a configuration frame. If external memory is used in an embodiment for storing a replica configuration frame, the replica configuration frame in such external memory, such as memory 154 of FIG. 1A, is modified. Subsequently this modified configuration information stored in external memory is used to modify configuration information stored in internal memory of the FPGA. If internal memory alone is used in an embodiment for maintaining configuration information, then modification of the configuration frame stored in internal memory may be used to cause the FPGA to be partially reconfigured.

At 904, a partial reconfiguration bitstream is generated responsive to the connection changes. In other words, the frame with the embedded changes is downloaded which causes the FPGA to be partially reconfigured by storing such downloaded information in internal memory of the FPGA via a configuration port of the FPGA.

Notably, not all existing connections need to be modified for reconfiguring an FPGA instantiated cross connect. Rather, connections that are to modified, including any and all connections to be made for a new connection or unmade for a redundant connection, are provided as command input to specify a desired input-to-output cross connectivity. Such cross connectivity means that intra-crossbar switch inputs and outputs are selectively coupled and uncoupled, such as via programmable input selects 908 of FIG. 8, responsive to the modified configuration information, for example as embedded in a frame of configuration bits. Notably, though partial reconfiguration is described, it should be appreciated that initial configuration or complete reconfiguration are applicable. However, by doing partial reconfiguration dynamically, it is possible to maintain operation of the crossbar switch while concurrently modifying connectivity of such crossbar switch. This means, for example, that the embedded soft-core or hard-core processor in the FPGA (FIG. 1A) can reconfigure a first configured part of the FPGA, while not affecting or interfering with the operation of a second configured part of the FPGA. In another embodiment an off-chip processor can reconfigure the first part, while the power is still connected and the second part of the FPGA continues active operation unaffected by the reconfiguration.

Notably, for an FPGA with an embedded processor (hard-core) or embedded processor instantiated with configurable logic (soft-core), dynamic or "on-the-fly" partial reconfiguration, such as described for partial reconfiguration flow 900, may be entirely done on-chip through use of an Internal Configuration Access Port ("ICAP"). FPGA internal memory, such as block RAM, may be used to store at least a partial replica of the current state of configuration bits for modification by an embedded processor. Frame bits are accessed via the ICAP for embedding any and all changes, and the modified frame bits are downloaded through the ICAP. Thus, the ICAP is used twice, once to access current state of configuration bits and once to download a bitstream to partially reconfigure the FPGA. A further description can be found in co-pending patent application, application Ser. No. 10/377,857, titled "Reconfiguration of a Programmable Logic Device Using Internal Control", by Brandon J. Blodget, et. al. filed Feb. 28, 2003, which is herein incorporated by reference.

In another embodiment, external memory is used to mirror internal configuration memory, such that both store the current state of configuration bits. Some of the configuration bits stored in the external memory are modified, and the bitstream for partial reconfiguration is downloaded from the external memory through the ICAP. In yet another embodiment the bitstream is downloaded through the SelectMap port (see the Virtex-II Pro™ Platform FPGA Handbook).

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps.

What is claimed is:

1. A programmable logic device, comprising:
   configurable logic blocks, the configurable logic blocks configured to provide a multi-stage crossbar switch;
   the multi-stage crossbar switch including:
      a first stage configured from a first portion of the configurable logic blocks to provide a first plurality of crossbars, the first stage having inputs;
      a second stage configured from a second portion of the configurable logic blocks to provide a second plurality of crossbars;
      a third stage configured from a third portion of the configurable logic blocks to provide a third plurality of crossbars, the third stage having outputs;
      first interconnects for coupling the first plurality of crossbars to the second plurality of crossbars; and
      second interconnects for coupling the second plurality of crossbars to the third plurality of crossbars;
   wherein the inputs and the outputs are selectable via reconfiguration while concurrently operating at least part of the multi-stage crossbar switch for responsive path configuration to provide input-to-output cross-connectivity via the first stage, the second stage and the third stage using the first interconnects and the second interconnects;
   wherein latency from any of the inputs cross-connected to any of the outputs is a same number of clock cycles without having to provide delay compensation.

2. The programmable logic device, according to claim 1, wherein the first plurality of crossbars is for receiving input data, and wherein the third plurality of crossbars is for outputting the input data.

3. The programmable logic device, according to claim 2, wherein the first plurality of crossbars are interleaved with the third plurality of crossbars.

4. The programmable logic device, according to claim 2, wherein the first interconnects and the second interconnects are disposed in an interconnect region, and wherein the second plurality of crossbars are disposed within the interconnect region.

5. The programmable logic device, according to claim 4, wherein the first plurality of crossbars and the third plurality of crossbars are not disposed within the interconnect region.

6. The programmable logic device, according to claim 4, wherein the second plurality of crossbars are arrayed.

7. The programmable logic device, according to claim 1, wherein each crossbar of the first plurality of crossbars comprise:
   a first set of the first portion of the configurable logic blocks configured to provide input flip-flops; and
   a second set of the first portion of the configurable logic blocks configured to provide multiplexers and output flip-flops.

8. The programmable logic device, according to claim 7, wherein outputs of the input flip-flops are selectively coupled to and uncoupled from function generators through partial reconfiguration.

9. The programmable logic device, according to claim 7, further comprising:
   double-length lines connected to the outputs of the input flip-flops; and
   programmable input select circuitry configured to selectively couple and uncouple function generators to and from the double-length lines.

10. The programmable logic device, according to claim 1, wherein each crossbar of the first plurality of crossbars, the second plurality of crossbars and the third plurality of crossbars comprises:
    at least one configurable logic block configured to provide at least one input register; and
    at least one other configurable logic block configured to provide at least one multiplexer, the at least one multiplexer coupled to the at least one input register.

11. The programmable logic device, according to claim 1, wherein each crossbar of the first plurality of crossbars, the second plurality of crossbars and the third plurality of crossbars pipelines data from an input register stage to a multiplexer stage and to an output register stage for three stage intra-crossbar processing.

12. The programmable logic device, according to claim 11, wherein the input register stage comprises at least one configurable logic block configured to provide an input flip-flop.

13. The programmable logic device, according to claim 12, wherein the multiplexer stage comprises at least one other configurable logic block configured to provide at least one multiplexer, the at least one multiplexer coupled to the at least one input register.

14. The programmable logic device, according to claim 13, wherein the data passes through the input flip-flop, the at least one multiplexer and an output flip-flop for the three stage intra-crossbar processing.

15. The programmable logic device, according to claim 14, wherein output of the at least one multiplexer is coupled as input to at least one other multiplexer for the three stage intra-crossbar processing for the third plurality of crossbars.

16. The programmable logic device, according to claim 1, wherein each crossbar of the second plurality of crossbars comprises:
a first set of the second portion of the configurable logic blocks configured to provide input flip-flops; and
a second set of the second portion of the configurable logic blocks configured to provide multiplexers and output flip-flops.

17. The programmable logic device, according to claim 16, wherein outputs of the input flip-flops are selectively coupled to and uncoupled from lookup tables through partial reconfiguration.

18. The programmable logic device, according to claim 16, further comprising:
double-length lines connected to the outputs of the input flip-flops; and
programmable input select circuitry configured to selectively couple and uncouple to lookup tables and from the double-length lines.

19. The programmable logic device, according to claim 1, wherein each crossbar of the third plurality of crossbars comprise:
a first set of the third portion of the configurable logic blocks configured to provide input flip-flops; and
a second set of the third portion of the configurable logic blocks configured to provide multiplexers and output flip-flops.

20. The programmable logic device, according to claim 19, wherein outputs of the input flip-flops are selectively coupled to and uncoupled from the lookup tables through partial reconfiguration.

21. The programmable logic device, according to claim 19, further comprising:
double-length lines connected to outputs of the input flip-flops; and
programmable input select circuitry connected to the double-length lines for selectively coupling and uncoupling lookup tables to and from the double-length lines.

22. A method for providing a crossbar switch, comprising:
providing a first portion of configurable logic configurable to provide a first stage of crossbars;
providing a second portion of configurable logic configurable to provide a second stage of crossbars;
providing a third portion of configurable logic configurable to provide a third stage of crossbars; and
partially reconfiguring at least one of the first, second and third stage of crossbars to provide an input-to-output cross-connection from input of the first portion of the configurable logic to output of the third portion of the configurable logic via the first, second and third portion of configurable logic;
wherein latency from any of the input of the first portion cross-connected to any of the output of the third portion is a same number of clock cycles without having to provide delay compensation.

23. The method, according to claim 22, wherein the partially reconfiguring comprises partial reconfiguration of a crossbar from each of the first stage of crossbars, the second stage of crossbars and the third stage of crossbars to provide the input-to-output cross-connection.

24. The method, according to claim 22, wherein the partial reconfiguring comprises partial reconfiguration of a crossbar from each of the first stage of crossbars and the third stage of crossbars to provide the input-to-output cross-connection.

25. The method, according to claim 22, wherein the partial reconfiguring is done while operating the crossbar switch.

26. The method, according to claim 22, wherein the partial reconfiguring does not affect operations in a fourth portion of the configurable logic not used in the partial reconfiguring.

27. The method, according to claim 22, wherein the crossbar switch is instantiated in a field programmable gate array ("FPGA"), the FPGA having a processor, a port and internal memory, the partial reconfiguring being done entirely on the FPGA by:
accessing via the port configuration information stored in the memory;
modifying the configuration information stored in the internal memory with the processor; and
writing via the port the configuration information as modified to dynamically reconfigure the configurable logic.

28. A crossbar switch for a programmable logic device, comprising:
input pins and output pins, each input pin being connectable to each output pin for cross-connectivity through an odd number of crossbar stages greater than one, the crossbar stages provided by configurable circuitry configured to provide crossbars, the cross-connectivity reconfigurable responsive to user programming to indicate which input pins are to be cross-connected to which output pins for the crossbars instantiated in the programmable logic device, wherein the crossbar stages instantiated are partially reconfigured to provide the cross-connectivity responsive to the user programming while maintaining operation of a portion of the crossbar stages;
wherein latency from any of the input pins cross-connected to any of the output pins is a same number of clock cycles without having to provide delay compensation.

29. The crossbar switch, according to claim 28, wherein each of the crossbars is provided in part using selectors and function generators, the selectors being under configuration bit control.

30. A crossbar switch kit, comprising:
a programmable logic device including configurable circuitry; and
configuration information for configuring the programmable logic device as a crossbar switch, the crossbar switch having input pins and output pins, each input pin being connectable to each output pin for cross-connectivity through an odd number of crossbar stages equal to or greater than three, the crossbar stages provided by configuring the configurable circuitry to provide crossbars, wherein the crossbars instantiated are reconfigurable to provide the cross-connectivity while maintaining operation of circuitry of the crossbars unaffected by reconfiguration;

wherein latency from any of the input pins cross-connected to any of the output pins is a same number of clock cycles without having to provide delay compensation.

31. The crossbar switch kit, according to claim 30, wherein the cross-connectivity is user determinable by selecting an input pin of the input pins to be cross-connected to a respective output pin.

32. The crossbar switch kit, according to claim 30, wherein the cross-connectivity is user determinable by selecting an input pin of the input pins to be cross-connected to a plurality of the output pins.

33. A method for instantiating a crossbar switch in a programmable logic device, comprising:
   providing predefined configuration bits for the instantiating of the crossbar infrastructure in the programmable logic device, the crossbar infrastructure including at least three crossbar stages; and
   providing user access to select one or more inputs and outputs of the crossbar infrastructure for responsively configuring path cross connectivity, wherein at least part of the crossbar infrastructure is concurrently operated while another part is being reconfigured to provide the path cross connectivity;
   wherein latency from any of the inputs cross-connected to any of the outputs is a same number of clock cycles without having to provide delay compensation.

34. The method, according to claim 33, wherein the user access comprises user definable configuration bit control for selection of the one or more inputs and outputs, the path cross connectivity configured responsive to the user definable configuration bit control.

35. An integrated circuit comprising:
   configurable logic blocks, the configurable logic blocks configured to provide a multi-stage crossbar switch;
   the multi-stage crossbar switch including:
      a first stage configured from a first portion of the configurable logic blocks to provide a first plurality of crossbars, the first stage having inputs;
      a second stage configured from a second portion of the configurable logic blocks to provide a second plurality of crossbars;
      a third stage configured from a third portion of the configurable logic blocks to provide a third plurality of crossbars, the third stage having outputs;
   first interconnects for coupling the first plurality of crossbars to the second plurality of crossbars; and
   second interconnects for coupling the second plurality of crossbars to the third plurality of crossbars; and
   an embedded processor operably configured to reconfigure at least one of the first, second, or third stages while maintaining operation of at least a portion of the multi-stage crossbar switch unaffected by reconfiguration;
   wherein latency from any of the inputs cross-connected to any of the outputs is a same number of clock cycles without having to provide delay compensation.

36. The integrated circuit of claim 35 wherein the first and third stages are dynamically reconfigured.

37. A programmable logic device comprising:
   a crossbar switch having configurable logic blocks, wherein the crossbar switch is a multistage crossbar switch having configurable interconnects coupling inputs of the multistage crossbar switch to outputs of the multi-stage crossbar switch;
   an embedded processor operably configured to reconfigure the crossbar switch while maintaining operation of at least a portion of the crossbar switch unaffected by reconfiguration;
   wherein latency from any of the inputs cross-connected to any of the outputs is a same number of clock cycles without having to provide delay compensation.

38. The programmable logic device of claim 37 wherein the embedded processor includes a soft-core or a hard-core processor.

39. The programmable logic device of claim 37 wherein the embedded processor is a circuit selected from a group consisting of a digital signal processor, a general-purpose processor, an application specific processor, and customized digital logic.

* * * * *